United States Patent Office 3,547,987
Patented Dec. 15, 1970

3,547,987
PROCESS FOR THE PREPARATION OF 3-(4-ALKOXYBENZOYLACETAMINO) - 4-ALKOXYBENZENESULFONATES
Masakuni Iwama, Isaburo Inoue, and Yutaka Takei, Tokyo, Japan, assignors to Konishiroku Photo Industry Co., Ltd., Tokyo, Japan
No Drawing. Filed Nov. 8, 1968, Ser. No. 774,516
Claims priority, application Japan, Nov. 13, 1967, 42/72,678
Int. Cl. C07c 143/38
U.S. Cl. 260—507
1 Claim

ABSTRACT OF THE DISCLOSURE

4 - alkoxybenzoylaceto - 2 - alkoxyanilide is reacted with chlorosulfonic acid in acetonitrile solvent to obtain 3-(4-alkoxybenzoylacetamido)-4-alkoxybenzenesulfonic acid which is then treated with an alkaline agent to produce the corresponding sulfonate.

---

This invention relates to a new process for the preparation of 3-(4-alkoxybenzoylacetamino)-4-alkoxybenzenesulfonates of the general formula:

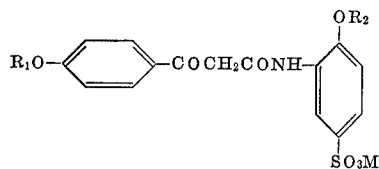

wherein $R_1$ stands for a saturated aliphatic hydrocarbon radical having 12–20 carbon atoms, $R_2$ for a lower alkyl radical and M for sodium or potassium.

Compounds represented by the above general formula are very useful as yellow color coupler for substractive color photography. Known heretofore as a process for preparing the compounds is a very complicated process as described in British Pat. 808,276 where the compounds are synthesized through the following route:

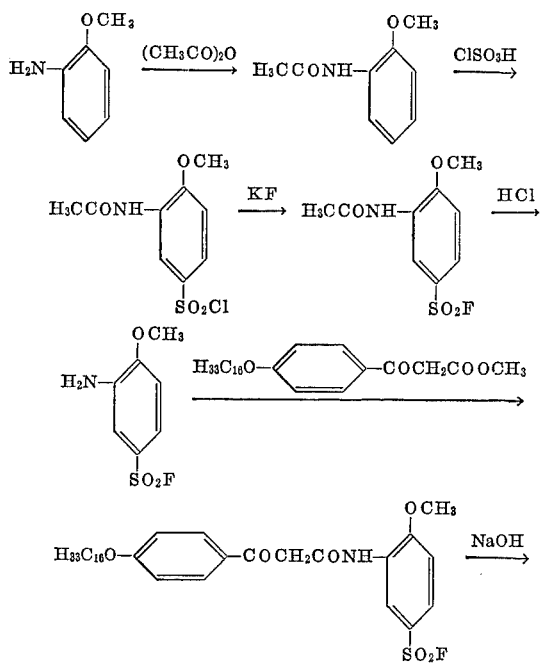

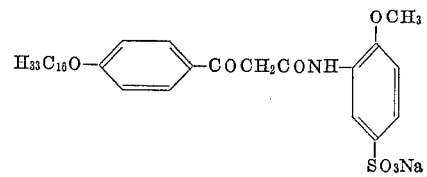

In such synthetic process, however, there are many drawbacks; a number of the reaction steps making the process complicated, corrosive damage of the reactors by fluorine during fluorination step and difficulty for maintaining the reaction condition to ensure hydrolysis of sulfonyl fluoride group alone during the hydrolysis step of the sulfonyl fluoride due to existence of easily hydrolyzable acid amide group. In addition, a poor yield is expected in such process. Thus, the above-mentioned prior art process is not commercially satisfactory.

Therefore, a process starting with 4-alkoxy-benzoylacet-2-alkoxyanilide and effecting direct sulfonation thereof is thinkable as a process for preparing the compounds. According to E. Gilbert "Sulfonation and Related Reactions" (John Wiley & Sons, 1965), etc. which give general explanations on sulfonation reactions, a method using fuming sulfuric acid, sulfuric anhydride, sulfamic acid, etc. alone or in mixture with a solvent such as chloroform, dichloroethane, dioxane or acetic acid is recommended to effect sulfonation. When 4-alkoxybenzoylacet-2-alkoxyanilide was directly sulfonated according to such sulfonation method, the formation of undesirable by-products is so much that it was very difficult to obtain the end product in good yield.

In British Pat. No. 978,550, there is disclosed a sulfonation method using a mixture of sulfuric acid and chlorosulfonic acid as a means for sulfonating a coupler of beta-keto acid anilide type containing a long chain alkyl group (which renders the coupler fast to diffusion) to introduce thereinto a water-solubilizing group. In case the sulfonating agent used in this reference was applied to sulfonation of 4-alkoxybenzoylaceto-2-alkoxyanilide, however, the formation of undesirable by-products was also so much that isolation of the end product, 3-(4-alkoxybenzoylacetamino)-4-alkoxybenzenesulfonic acid can scarcely be made.

As the results of a number of experiments, the inventors have found that excellent results were obtained only by a process using chlorosulfonic acid together with acetonitrile as solvent to effect sulfonation, the process being shown by the following reaction formulas:

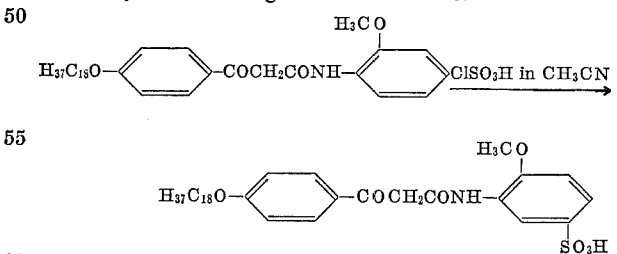

According to the process of this invention, the starting material, 4-alkoxybenzoylaceto-2-alkoxyanilide, obtained by condensing a lower alkoxyaniline in a conventional manner with beta-keto acid ester is reacted with chlorosulfonic acid in acetonitrile at a temperature below 45° C. and then the reaction product is treated with an alkaling agent such as sodium acetate to yield the end products in the form of sodium sulfonate. The yield of the end product reaches, when the calculation is made on the basis of the alkoxyaniline, to 37% and excellent in comparison with that by the fluorination process calculated as 19%.

The process of this invention is carried out as follows:

10–20 moles of chlorosulfonic acid are added to acetonitrile in a volume of 10 times as much as the amount of the anilide. To the solution is added under agitation 1 mole of the acetanilide at 30°–40° C. and agitation is continued for 1–3 hours at the same temperature to permit complete dissolution of the anilide. To the reaction liquid is added at 30°–40° C. ethyl alcohol in a volume of 1.5 times as much as the amount of the anilide and then the solution is cooled to 20°–25° C. to precipitate the sulfonate which is collected by filtration.

The sulfonate is dissolved into methanol and then mixed with a methanolic solution of an alkali metal salt of organic acid such as sodium acetate or caustic alkali to precipitate a metal salt of the sulfonate. After filtration, the metal salt is boiled with a 20–30 times volume of acetone and then recrystallized from 97% by volume of methanol to yield the end product. The yield of the sulfonate is 40–50%. This process is applicable also to the case of using the anilide in which the long chain alkyl group has 12–20 carbon atoms.

As the order of mixing the reactants, the acetanilide is added as described above to a mixture of chlorosulfonic acid and acetonitrile, or alternatively, chlorosulfonic acid may be added to a mixture of the acetanilide and acetonitrile; whichever is usable for performing this invention, but the latter method is preferred because of its being easy in temperature control. However, the use of chlorosulfonic acid in an amount more than 20 moles or adoption of a reaction temperature above 45° C. is not recommended for the reason that the yield of the sulfonate is extremely decreased.

As stated above, a process for the preparation of 3-(4-alkoxybenzoylacetamino) - 4 - alkoxybenzenesulfonates according to this invention is industrially advantageous in comparison with conventional known processes starting with the fluorine compounds, particularly in that the number of the reaction steps is few and the reaction liquid causes no corrosion or damage of the reactors.

The following examples illustrate the invention.

EXAMPLE 1

To 95 ml. of xylene are added 30 g. of methyl 4-octadecyloxybenzoylacetate and 9.5 g. of o-anisidine and the mixture is boiled under reflux. 40 milliliters of a mixture of methanol and xylene formed during the reflux are distilled and the residual material is cooled. The solidified product is rinsed out in methanol and the precipitate is filtered by suction, washed with methanol and dried to obtain the starting material of this invention, 33 g. of 4-octadecyloxybenzoylaceto-2-methoxyanilide, which is a white powder having a melting point of 104°–105° C. (Yield 93%)

In a 500 ml. conical flask are placed 200 ml. of acetonitrile and 35 ml. of chlorosulfonic acid are mixed therewith at a temperature below 40° C. The mixture is cooled to 25°–30° C. and 20 g. of the above-resulted benzoylacetanilide are added at a time under agitation. Agitation is continued for one hour at 30°–35° C. and 35 ml. of ethanol are added at 35°–40° C. 100 ml. of acetonitrile are then added and a solid material precipitated at 20°–25° C. is filtered and washed with acetonitrile. The precipitated material is dissolved under heating into 100 ml. of methanol and a solution of 5 g. of anhydrous sodium acetate in 100 ml. of methanol is added. The mixture is once boiled, filtered while hot and then allowed to stand for cooling. The precipitate is filtered, boiled with 300 ml. of acetone for 10 minutes and filtered while hot. The residual precipitate is dried and recrystallized from a mixture of 140 ml. of methanol and 5 ml. of water to obtain 10 g. of a white powder (Yield of the sulfonate: 44%). Decomposition point 210°–220° C.

Elemental analysis as $C_{34}H_{50}O_7NSNa \cdot H_2O$ (M. W. 657.84).—Calc. (percent): C, 62.07; H, 7.97; N, 2.13; Na, 3.50. Found (percent): C, 62.22; H, 8.07; N, 2.13; Na, 3.64.

EXAMPLE 2

Using 4-dodecyloxybenzoylacet-2-methoxyanilide in place of 4 - octadecyloxybenzoylacet-2-methoxyanilide, the reaction is carried out in a manner similar to that of Example 1 to obtain sodium 3-(4-dodecyloxybenzoylacetamino)-4-methoxybenzenesulfonate (Yield of the sulfonate: 48%). Decomposition point 220°–225° C.

Elemental analysis as $C_{28}H_{38}O_7NSNa \cdot H_2O$ (M. W. 557.84).—Calc. (percent): C, 60.28; H, 7.23; N, 2.51; Na, 4.12. Found (percent): C, 60.54; H, 7.31; N, 2.80; Na, 4.03.

What we claim is:

1. A process for the preparation of 3-(4-alkoxybenzoylacetamine)-4-alkoxybenzenesulfonates, said process comprising reacting a 4-alkoxybenzoylaceto-2-alkoxyanilide with chlorosulfonic acid in acetonitrile at a temperature below 45° C. and then treating the thus formed reaction product with an alkaline agent.

References Cited

UNITED STATES PATENTS 2,950,314  8/1960  De Cat et al.

DANIEL D. HORWITZ, Primary Examiner